UNITED STATES PATENT OFFICE.

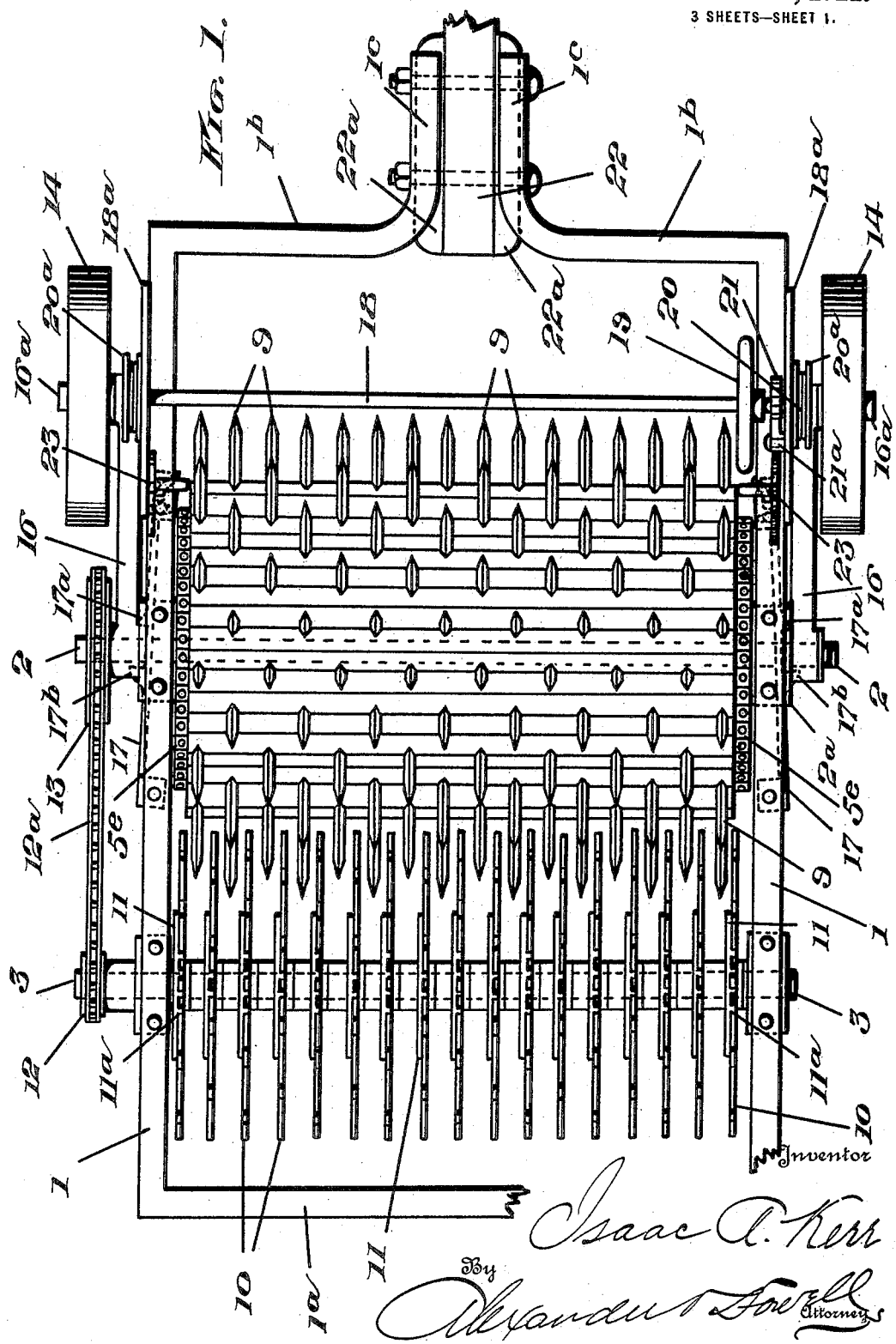

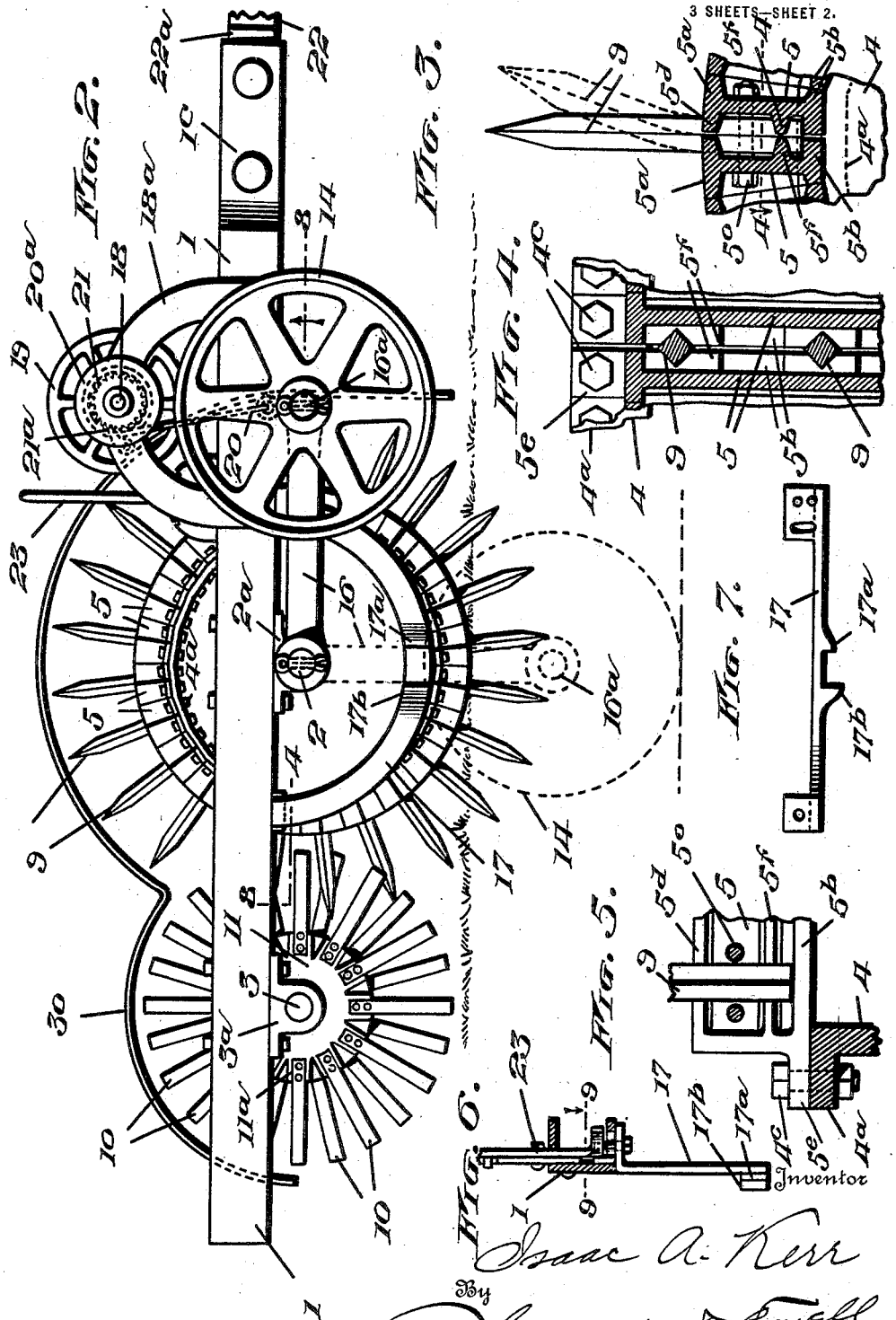

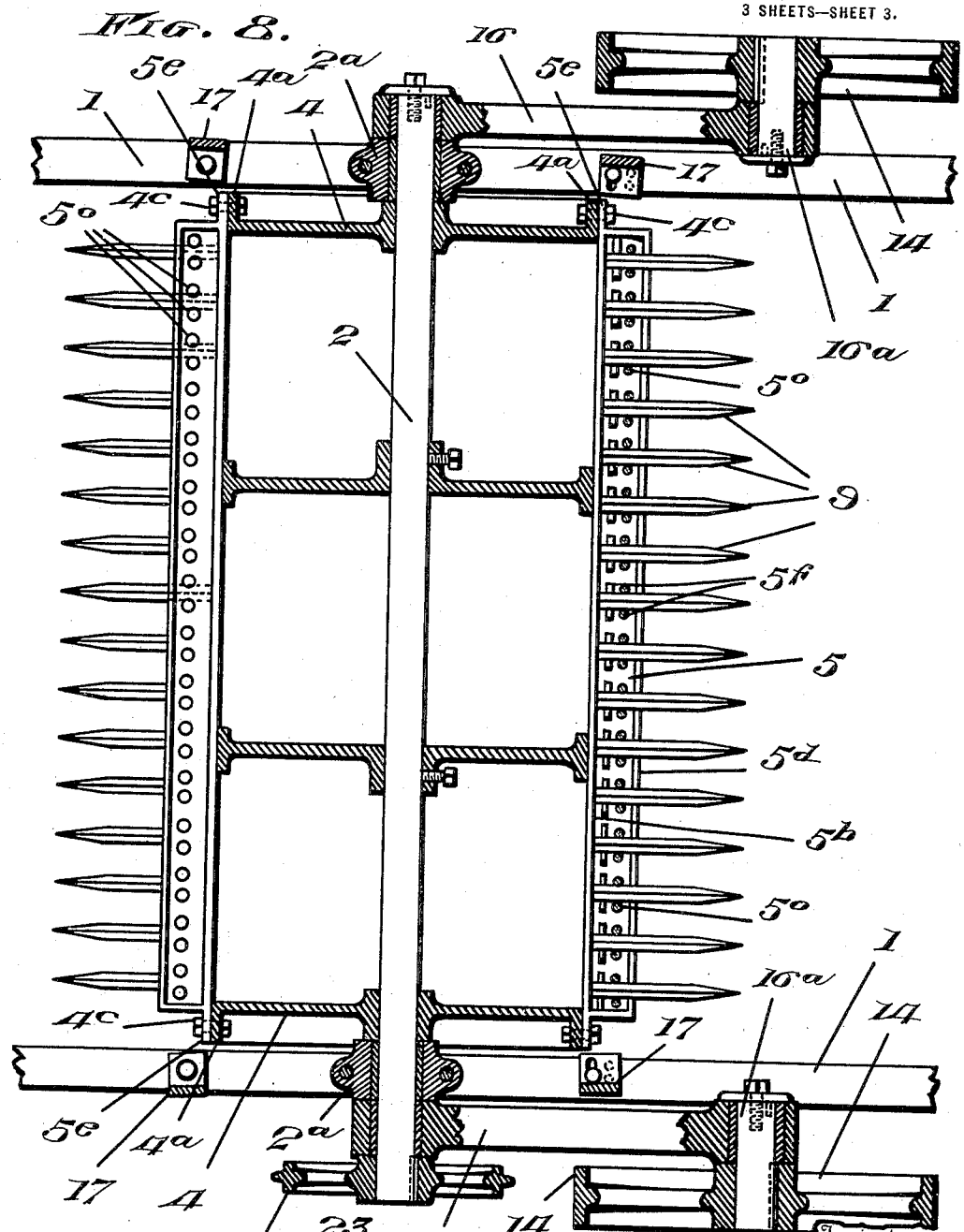

ISAAC A. KERR, OF MEMPHIS, TENNESSEE.

SOIL-DISINTEGRATOR.

1,397,428.  Specification of Letters Patent.  Patented Nov. 15, 1921.

Application filed December 17, 1920. Serial No. 431,412.

*To all whom it may concern:*

Be it known that I, ISAAC A. KERR, a citizen of the United States, residing at Memphis, in the county of Shelby and State of Tennessee, have invented certain new and useful Improvements in Soil-Disintegrators; and I hereby declare that the following is a full, clear, and exact description thereof, reference being had to the accompanying drawings, which form part of this specification.

This invention is a novel improvement in machines to tear up and disintegrate soil and provides a machine which will effectively turn and pulverize the soil and leave it in excellent condition for planting without the necessity of plowing and harrowing.

The major objects of the invention are to provide a novel construction of digging cylinder; to provide novel means for fastening the spikes or diggers to the cylinder and to provide novel means to enable the machine to be readily moved from place to place when it is not desired to have the cylinder operate. Minor objects of the invention will be hereinafter set forth.

In the accompanying drawings I have illustrated one practical machine embodying the invention and will describe the same with reference thereto and summarize in the claims the essentials of the invention and the novel features of construction and novel arrangements of parts for which protection is desired.

In said drawings:

Figure 1 is a top plan view of the machine with the top hood removed.

Fig. 2 is a side elevation thereof showing the machine in condition for operating upon the ground, and also showing in dotted lines the transport wheels adjusted to elevate the digging cylinder when it is desired to move the machine from one place to another without the cylinder operating.

Fig. 3 is an enlarged detail section showing the manner of fastening the spikes to the cylinder.

Fig. 4 is a transverse section on the line 4—4 Fig. 3.

Fig. 5 is an enlarged detail section showing the connection of the bars to the heads.

Fig. 6 is a detail section, showing the means for operating the latch plate 17.

Fig. 7 is a detail view of one of the latch plates detached.

Fig. 8 is an enlarged detail plane section through the cylinder, looking from the under side of the frame.

Fig. 9 is an enlarged detail section on the line 9—9 Fig. 6.

The machine as shown has a frame preferably made of channel iron, and comprising side members 1, rear member 1ª and front members 1ᵇ which are L-shaped so that their inner ends 1ᶜ project forwardly and are adapted for connection with a tongue or other traction member 22 by which the machine can be moved forward either by tractor or by animal power. Wooden blocks 22ª may be placed against the inner sides of the parts 1ᶜ to make a close fit with and against the tongue 22.

Extending transversely of the frame 1 is a digging and disintegrating cylinder which preferably has a shaft 2 journaled in bearings 2ª attached to the opposite side members 1 of the frame as shown, and which may be of any suitable construction and attached to the frame in any desired manner. The cylinder is composed of heads 4 preferably keyed on the shaft 2, and a series of transversely disposed pairs of metal bars 5. Each bar 5 is approximately I-shaped in cross section (see Fig. 3) and is provided with a T-shaped head 5ª, and the heads of the adjacent bars 5 abut, so that the heads of the bars form the practically continuous peripheral surface of the cylinder and enable it to roll the ground over which it passes. The bars 5 also preferably have T-shaped inner ends 5ᵇ (Fig. 3); and they have end portions 5ᶜ which are secured to flanges 4ª on the heads 4 by bolts 4ᶜ (see Figs. 4 and 8). The bars 5 in each pair are bolted together by means of transverse bolts 5ᵒ (see Figs. 3 and 8).

Clamped between each pair of bars 5 is a series of spaced digging members or spikes 9. These spikes are detachably secured between the heads of bars 5 which heads 5ª are notched to engage and bind the spikes. The spikes are also held between flanges or lugs 5ᶠ projecting from the opposed faces of the bars 5 in each pair, and notched to engage and bind the inner ends of the spikes (Figs. 3, 4 and 8). Thus the spikes are securely held both against rotative movement and lateral play, and are securely fastened to the cylinder. Each pair of bars 5 forms a longitudinal spike carrying member; and a plurality of these spike carrying members are bolted to the cylinder and form the periphery of the cylinder, and from such periphery the spikes project as indicated in the drawings. The spikes 9 may be straight, as shown in full lines in Fig. 3, or they might be bent or inclined more or less if desired, (as indicated in dotted lines in Fig. 3). These spikes may have points of any desired shape but are preferably diamond or chisel pointed, as indicated in Fig. 3. If any spike should become damaged the pair of bars to which it is attached can be readily detached from the cylinder, and the injured spike removed and replaced, and such spike carrying bar placed in position on the cylinder.

Preferably the alternate spike carrying bars, or pairs of bars, have the spikes attached thereto in such manner that when the bars are attached to the cylinder the spikes in the adjacent longitudinal rows of the cylinder will alternate with bars on the adjacent rows as indicated in Fig. 1, so that the spikes in one row will enter the ground intermediate the points in which the preceding and following rows of spikes enter the same; thus insuring the breaking up and disintegration of the soil.

A cleaning and pulverizing cylinder is preferably mounted on the frame in rear of the disintegrating cylinder. As shown a shaft 3 is journaled in bearings 3ª attached to the frame in rear of the spike cylinder, and mounted on this shaft 3 are a series of disks 11 having radially disposed slots 11ª in which are bolted laterally projecting arms 10. Preferably the disks 11 are so arranged that the bars 10 attached to the disks will alternate with the circumferential series of teeth or spikes 9 on the cylinder.

Preferably the disks 11ª are keyed on the shaft 3 so that the bars 10 on each disk alternate with the bars 10 on the adjacent disk.

These bars 10 act as cleaners and pulverizers to clear the spikes of any trash, brush, sod or clods which might be carried up thereby and also to break up and pulverize any clods which might drop behind the disintegrating cylinder and to reduce the surface of the soil in the rear of the machine to a practically uniform pulverized condition. The shaft 3 may be rotated in direction toward the disintegrating cylinder by any suitable means. Preferably the shaft 3 carries a sprocket gear 12 connected by a sprocket chain 12ª with a master sprocket 13 keyed on the shaft 2.

To prevent scattering of trash, dirt, etc., by the bars 10, a hood or cover plate 30 may be attached to the machine and extend over the disintegrating cylinder and over the clearing cylinder and the pin in rear of the latter, as indicated in Fig. 2.

The machine is to be drawn over the field to be plowed by animals or tractors, and as it is drawn thereover the spikes 9 dig into the ground and thoroughly loosen and break it up; and any trash, large clods, sod, etc., which may be carried up by the spikes in rear of the cylinder are struck and broken up and cleared from the spikes by the action of the bars 10, the shaft 3 preferably being rotated much faster than the shaft 2.

In order to facilitate the movement of the machine from one field to another or over ground which it is not desired to operate upon, suitable means are provided for moving the frame 1 with the digging and clearing cylinders elevated. For this purpose, in the construction shown, arms 16 are loosely hung on the shaft 2 at the outer sides of the frame. Each arm 16 has on its outer end a stub shaft 16ª on which is the wheel 14. When the machine is to be operated the frame 16 and the wheels 14 are held in raised position as shown in Figs. 1 and 2 by means of cables 20 attached to drums 20ª on a shaft 18, which is journaled in brackets 18ª attached to the side members 1 in advance of the shaft 2. This shaft 18 may be rotated by any suitable means, as by hand wheel 19 keyed thereon, and is provided with a ratchet 21 engaged by a pawl 21ª on the bracket 18ª, so that the wheels 14 may be suspended in inactive position, as shown in full lines in Fig. 2, when the machine is being used to disintegrate ground. When it is desired to move the machine to another field or position without the diggers operating, the wheels 14 can be dropped upon the ground and then the machine frame pulled forward until the wheels 14 are in the position indicated in dotted lines in Fig. 2 directly beneath the shaft 2; and this of course results in raising the frame 1 with the digging and clearing cylinders out of operative position, the whole mechanism being then supported upon the wheels 14. The bars 16 may be held in this lowered position by any suitable means. As shown these arms 16 swing close to latch plates 17 attached to the frame (see Figs. 2, 7 and 8). Each latch plate is provided with a beveled catch lug 17ª and with a stop lug 17ᵇ. As the arms 16 reach vertical position they pass lugs 17ª and engage stop lugs 17ᵇ and the latch plates 17 lock the arms in lowered position between the lugs 17ª and 17ᵇ. When it is desired to release arms 16 plates 17 can be moved so that the arms 16 can clear the lugs 17ª, and then by a slight backward movement of the frame the digging cylinder will drop onto the ground, and the wheels 14 can then be readily raised to the position shown in full lines in Fig. 1 by rotating the shaft 18 so as to wind up the cables 20. If desired levers 23 can be mounted on the frame, their lower ends engaged with the members 17, and by moving said levers the latches can be disengaged from the arms 16.

As shown (Figs. 6 and 9) the lever 23 has a cam finger 23ª on its lower end which is engaged between pins or lugs 17ⁿ on the forward end of the related latch member 17, which forward end has a slot 17° engaging a bolt 17ᵖ attached to the frame. The lugs 17ⁿ may project through an opening in the side frame (see Fig. 6) so that they can be readily engaged by the cam end of the lever. By oscillating the lever the forward end of latch 17 can be swung inward sufficiently to disengage the catch 17ⁿ from the arm 16 and thus permit the latter to be raised to operative position. The operation of the various features of the invention have been already discussed and will be obvious from the foregoing description and the drawings.

When the machine is drawn forward over the ground the spikes break and turn the soil in front of the digging cylinder and the latter rolls the soil smooth while the teeth on the digger cylinder turn the soil upward in rear of the shaft 2 and the cleaner cylinder reduces the soil to perfect condition for planting; this machine doing the work of a plow on the average farm land and also does away with the necessity of harrowing.

What I claim is:

1. For a machine of the character described, a disintegrating cylinder comprising pairs of bars and series of spikes or digging members clamped between the bars, said bars being provided with notches in their heads to position the spikes, substantially as described.

2. In a disintegrating cylinder as set forth in claim 1; the heads of the bars being notched on their opposed faces for engagement of the spikes or digging members; said bars also having notched members on their opposed sides adapted to engage the inner ends of the spikes, substantially as described.

3. In a disintegrating cylinder as set forth in claim 1; pairs of bars approximately I-shaped in cross section, the heads of the adjacent bars practically forming the roller surface, and said heads being notched on their opposed faces for engagement of the digging members or spikes; said bars also having notched members on their opposed sides adapted to engage the inner ends of the spikes, substantially as described.

4. In a machine of the character described, a disintegrating cylinder comprising heads and pairs of bars attached to said heads, the outer portions of the bars forming the peripheral surface of the cylinder; the outer portions of the bars being notched on their opposed faces for the engagement of digging members or spikes inserted between the bars, said bars also having notched members on their opposed faces adapted to engage the inner ends of the spikes to secure and position them in the machine, the bars together forming a substantially continuous cylindrical surface for the cylinder adapted to roll the ground; and spikes to disintegrate or turn the soil.

5. In a machine of the character described, a disintegrating cylinder comprising heads, and pairs of bars attached to said heads, the bars being approximately I-shaped in cross section, the heads of the bars being notched on their opposed faces for the engagement of digging members or spikes inserted between the bars, said bars also having notched members on their opposed faces adapted to engage the inner ends of the spikes or digging members to secure and position them in the machine, the heads of the bars forming a substantially continuous cylindrical surface for the cylinder adapted to roll the ground; and spikes to disintegrate or turn the soil.

In testimony that I claim the foregoing as my own, I affix my signature.

ISAAC A. KERR.